(12) United States Patent
Koh et al.

(10) Patent No.: US 7,395,286 B1
(45) Date of Patent: Jul. 1, 2008

(54) METHOD FOR GENERATING NON-OVERLAPPING N-PHASES OF DIVIDE-BY-N CLOCKS WITH PRECISE 1/N DUTY RATIO USING A SHIFT REGISTER

(75) Inventors: Yongseon Koh, Palo Alto, CA (US); Jitendra Mohan, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 839 days.

(21) Appl. No.: 10/751,674

(22) Filed: Jan. 5, 2004

(51) Int. Cl.
*G06F 7/52* (2006.01)
*G06F 1/02* (2006.01)

(52) U.S. Cl. ....................... 708/103; 708/270
(58) Field of Classification Search ................. 708/103, 708/270–277
See application file for complete search history.

(56) References Cited

U.S. PATENT DOCUMENTS

| | | | | |
|---|---|---|---|---|
| 4,296,407 A * | 10/1981 | Minakuchi | ................. | 341/147 |
| 4,315,166 A * | 2/1982 | Hughes | ........................ | 708/103 |
| 4,430,722 A * | 2/1984 | Massen et al. | ............... | 708/425 |
| 4,590,440 A * | 5/1986 | Haque et al. | ................... | 331/17 |
| 5,020,082 A * | 5/1991 | Takeda | ........................ | 377/44 |
| 5,065,415 A * | 11/1991 | Yamashita | .................... | 377/52 |
| 5,650,738 A * | 7/1997 | Taylor et al. | ................. | 327/237 |
| 5,703,514 A * | 12/1997 | Hsu et al. | .................... | 327/237 |
| 6,163,182 A * | 12/2000 | Canard et al. | ............... | 327/117 |
| 6,271,682 B1* | 8/2001 | Lindsay | ...................... | 708/272 |
| 6,356,123 B1* | 3/2002 | Lee et al. | ..................... | 708/103 |
| 6,725,245 B2* | 4/2004 | Bucska | ........................ | 708/103 |
| 6,883,012 B1* | 4/2005 | Ryan | ........................... | 708/277 |
| 2004/0012415 A1* | 1/2004 | Kouzuma | .................. | 327/113 |

* cited by examiner

*Primary Examiner*—Chat C. Do

(57) ABSTRACT

A divide-by-N clock frequency divider producing N non-overlapping clocks each with precise 1/N duty ratio is implemented by a counter, a token generator and N-bit shift register. Every N clock cycles, a pulse is generated as a token from a logical combination of signals from the counter. The pulse is passed along a shift register having balanced load capacitances under control of the clock edge, ensuring a precise 1/N duty ratio that is unaffected by load capacitances from the fault state detection and/or reset circuitry. In this manner, a higher operating frequency may be achieved with low power consumption.

20 Claims, 3 Drawing Sheets

METHOD FOR GENERATING NON-OVERLAPPING N-PHASES OF DIVIDE-BY-N CLOCKS WITH PRECISE 1/N DUTY RATIO USING A SHIFT REGISTER

CROSS-REFERENCE TO RELATED APPLICATION

The subject matter of this application is related to the subject matter disclosed in commonly assigned, U.S. patent application Ser. No. 10/751,673 entitled "A FAULT STATE DETECTION MECHANISM FOR A RING-COUNTER-BASED FREQUENCY DIVIDER-BY-N THAT GENERATES NON-OVERLAPPING N-PHASES OF DIVIDE-BY-N CLOCKS WITH 1/N DUTY RATIO" and filed on an even date herewith, now U.S. Pat. No. 6,950,490, the subject matter of which is incorporated by reference herein.

TECHNICAL FIELD OF THE INVENTION

The present invention is directed, in general, to clock frequency dividers and, more specifically, to dividing a clock signal into N signals each with a 1/N duty ratio and non-overlapping asserted phases.

BACKGROUND OF THE INVENTION

N phases of divide-by-N clocks with a 1/N duty ratio may be utilized to serialize N bits of parallel data into a serial data stream using a multiplexer. One method of generating N phases of divide-by-N clocks with a 1/N duty ratio is to use a counter and a decoder, as illustrated in FIG. 5. The clock divider circuit 500 depicted in FIG. 5 includes an input 501 receiving a clock signal CK at frequency f at an n-bit counter 502, which counts from 0 to N−1. Counter 502 may be implemented, for example, by an n-bit series of flip-flops, where $3 \leq N \leq 2^n$. A decoder 503 receives the n-bit output of counter 502 and generates N phases of the clock signal CK each at a frequency f/N at outputs 504.

FIG. 6 depicts in greater detail an exemplary implementation of a divide-by-five clock divider 600 utilizing a counter 502 and a decoder 503. The counter 502 is implemented by a series of three flip-flops clocked by the clock signal CK at frequency f, with the inverted outputs of the second and third logically combined by an AND gate, the output of which is passed to the input of the first flip-flop in the series. A three bit output signal is taken from the inverted output of the first flip-flop and the non-inverted outputs of the second and third, then passed to the decoder 503. Decoder 503 includes logical gates (AND gates with selective inputs inverted in the example shown) generating the N clock signal each having non-overlapping asserted phases with a 1/N duty cycle at a frequency f/5.

One disadvantage of the approach depicted and described is that the large load capacitances from the decoding logic 503 decreases the maximum operating frequency. To increase the operating frequency, large buffers that consume substantial power are often inserted in between the counter and the decoder. Another disadvantage is that the unbalanced load capacitances from the counter reset circuit (not shown) and the decoder causes the phases to overlap and/or the duty ration to deviate from the desired value of 1/N at high operating frequencies.

There is, therefore, a need in the art for clock divider dividing a clock signal into N non-overlapping phases with a precise 1/N duty ratio at high operating frequencies.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
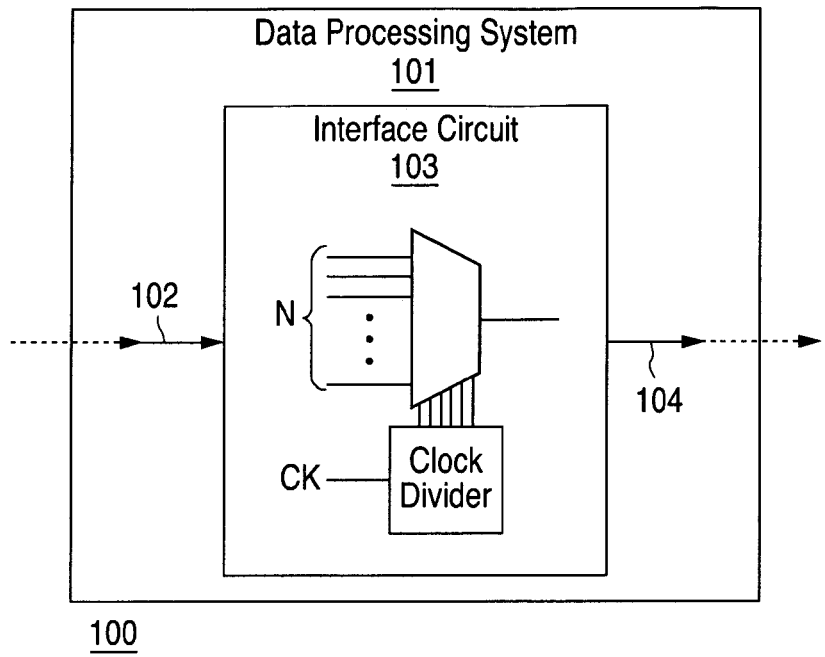
FIG. 1 depicts a communications system including a clock frequency divider according to one embodiment of the present invention.

To address the above-discussed deficiencies of the prior art, it is a primary object of the present invention to provide, for use in a serializing circuit within a communications system, a divide-by-N clock frequency divider producing N non-overlapping clocks each with precise 1/N duty ratio that is implemented by a counter, a token generator and N-bit shift register. Every N clock cycles, a pulse is generated as a token from a logical combination of signals from the counter. The pulse is passed along a shift register having balanced load capacitances under control of the clock edge, ensuring a precise 1/N duty ratio that is unaffected by load capacitances from the fault state detection and/or reset circuitry. In this manner, a higher operating frequency may be achieved with low power consumption.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the detailed description below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller might be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a communications system including a clock frequency divider according to one embodiment of the present invention. Communications system 100 includes at least a data processing system 101, which may be, for example, a computer (desktop or laptop), a mobile telephone, a wireless personal digital assistant (PDA) or other device. The data processing system 101 includes an input 102 to an interface circuit 103 in which N parallel data signals are serialized to an output 104 by a multiplexer under the control of a clock divider operating on a clock signal CK. Either or both of inputs 102 and 104 may optionally receive or transmit signal(s) external to data processing system 101, and clock CK may be received from an external source of generated internally within either data processing system 101 or interface circuit 103.

Those skilled in the art will recognize that the full construction and operation of a communications system is not depicted or described herein. Instead, for simplicity and clarity only so much of the construction and operation of a communications system as is unique to the present invention or necessary for understanding the present invention is depicted and described.

Figure 2:
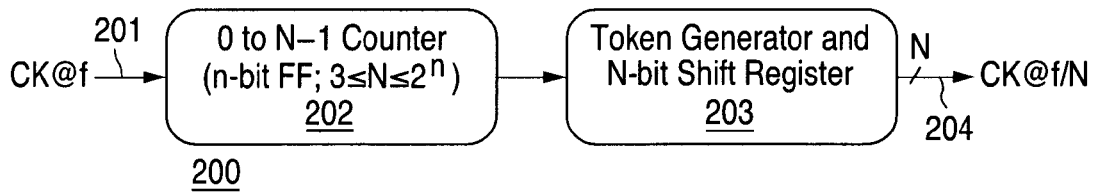
FIG. 2 illustrates in greater detail a clock frequency divider according to one embodiment of the present invention.
Figure 5:
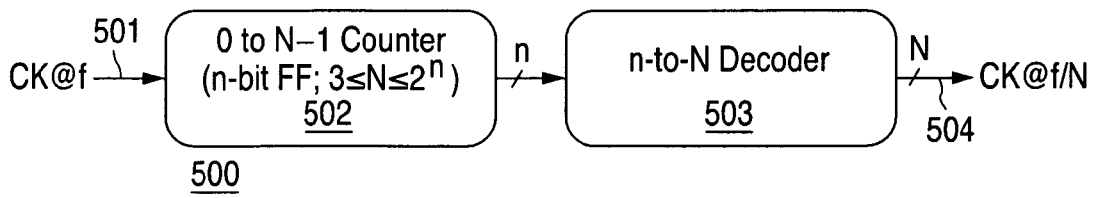
FIGS. 5 and 6 illustrate a clock frequency divider utilizing a counter and a decoder.

FIG. 2 illustrates in greater detail a clock frequency divider according to one embodiment of the present invention. Clock frequency divider 200, implemented within interface circuit 103, includes an input 201 receiving a clock CK at frequency f for a 0 to N−1 counter 202. Counter 202 is composed of a series of n flip-flops. An output of counter 202 is passed to token generator and N-bit shift register 203. Within token generator and N-bit shift register 203, a pulse with 1/N duty ratio is generated from the outputs of counter 202 at every Nth clock cycle as a token. The token pulse can be obtained from any of the N valid states of the counter 202 using an n-input AND gate. Depending on how the counter 202 is implemented, the combinational logic required within token generator and N-bit shift register 203 may be even further reduced.

Figure 3:
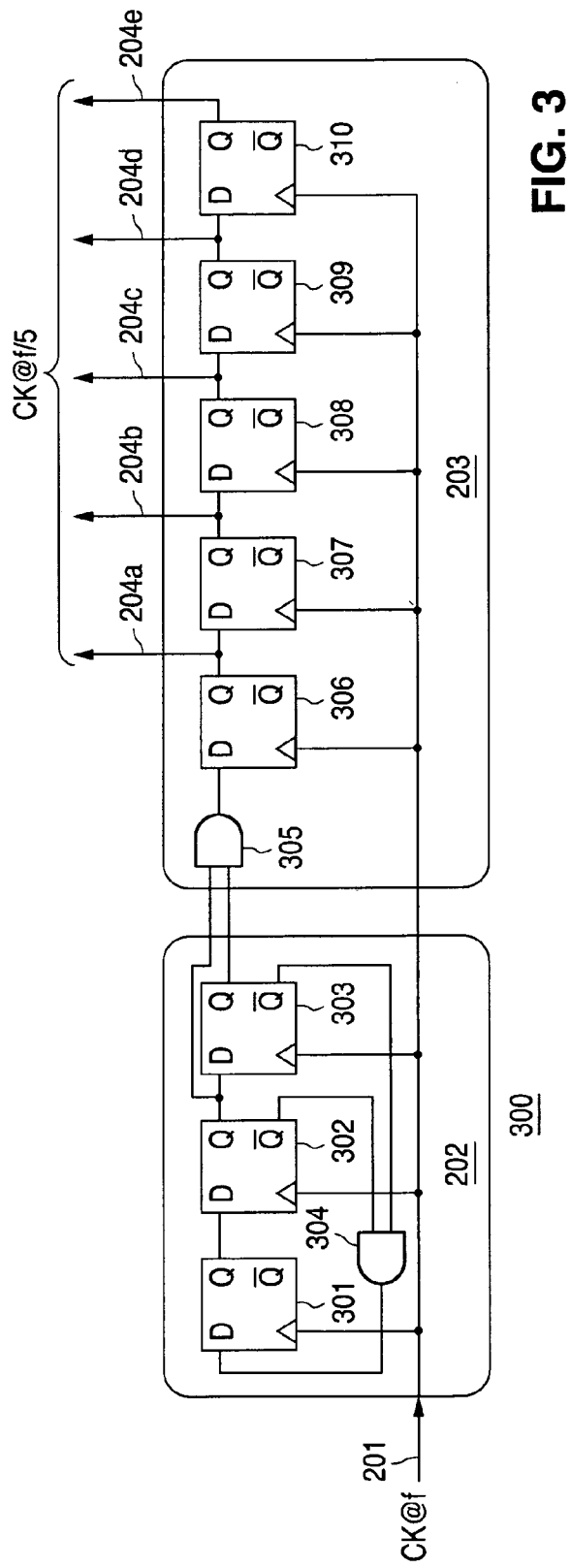
FIG. 3 depicts an exemplary implementation of a divide-by-5 clock frequency divider according to one embodiment of the present invention.
Figure 6:
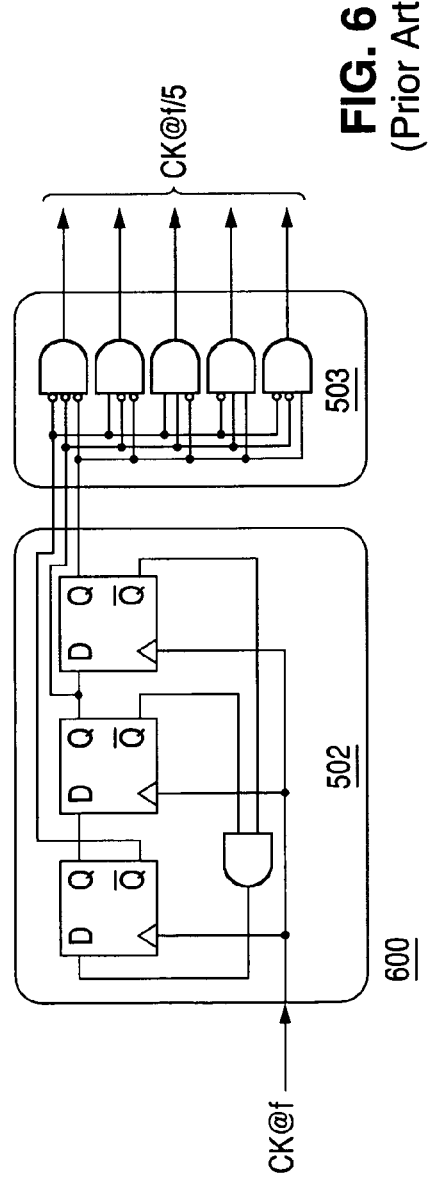

FIG. 3 depicts an exemplary implementation of a divide-by-5 clock frequency divider according to one embodiment of the present invention. The counter 202 within clock frequency divider 300 includes a series of three flip-flops 301-303, with the inverted outputs for the second and third flip-flops 302-303 in the series logically combined by an AND gate 304. The output of the AND gate 304 is connected to the input of the first flip-flop 301 within the series.

In the example shown, each bit of the divided-by-5 counter 202 has a 40% duty cycle, or 2/5 duty ratio. Accordingly, token generator and N-bit shift register 203 generates the token by a logical AND 305 of (any) two consecutive counter bits. The token pulse, with 1/N duty ratio, is then passed through the N-bits of a shift register formed by a series of flip-flops 306-310, thereby generating N phases of divide-by-N clocks on outputs 201a-201e.

In the present invention, the mismatch from fault-state detection and/or reset circuitry (not shown) affects only the bits in the counter 202, not the bits in the shift register (flip-flops 306-310). Therefore a precise 1/N duty ratio is guaranteed by the sampling edge of the input clock because the load capacitances of the shift register are balanced. Using the present invention, a high operating frequency may be achieved at low power consumption. The present invention is applicable to all semiconductor integrated circuit processes, such as rail-to-rail swing digital complementary metal-oxide-semiconductor (CMOS) logic, low-voltage swing differential current steering CMOS logic, silicon bipolar junction transistor (BJT) and/or bipolar CMOS (BiCMOS) logic, silicon germanium heterojunction bipolar junction transistor (SiGe HBT) logic, etc.

Figure 4:
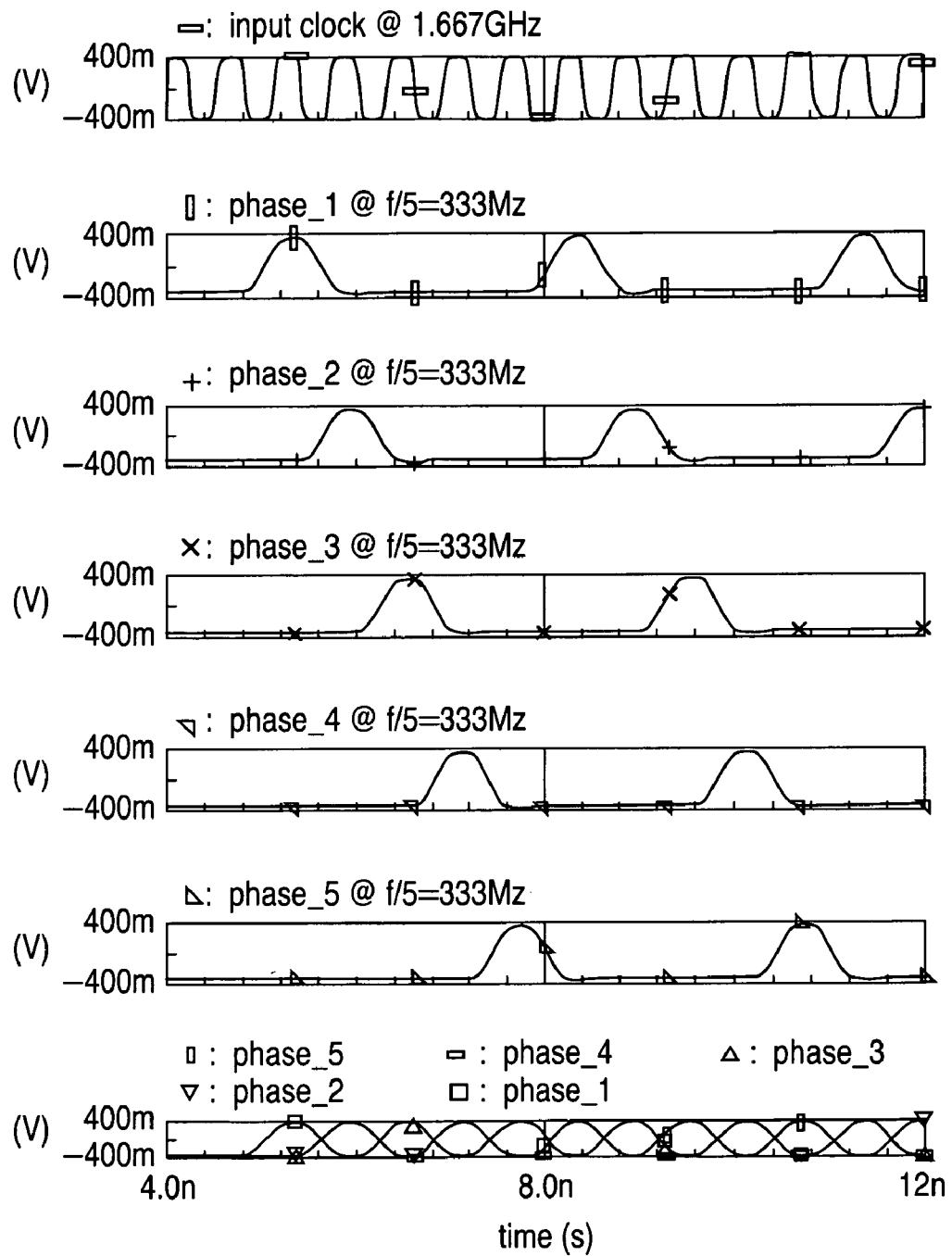
FIG. 4 depicts transient simulation for a divide-by-5 clock frequency divider according to one embodiment of the present invention.

FIG. 4 depicts transient simulation for a divide-by-5 clock frequency divider according to one embodiment of the present invention. The top trace is the input clock signal at 1.667 gigaHertz (GHz). The next five signal traces are, individually, each phase of the divide-by-5 output clocks with a 1/5 duty ratio at 333 MHz. The last row is all five phases of the output clocks superimposed to illustrate the non-overlapping property of those clocks.

The present invention generates non-overlapping N phases of divide-by-N clocks with precise 1/N duty ratio using a shift register. The clock frequency divider includes a counter with n flip-flops that counts from 0 to N−1 and a pulse generator. A pulse with 1/N duty ratio is generated from any combination of n bit flip-flop outputs at every Nth clock cycle. The pulse is passed onto N bits of shift registers as a token, yielding N phases of divide-by-N clocks with precise 1/N duty ratio. The token pulse may be any of the N valid counter states or a further logical reduction thereof. Using the present invention, a higher operating frequency may be achieved at low power consumption using any semiconductor integrated circuit process. Since there are only three flip-flops in the exemplary divide-by-5 implementation, the clock loading is low.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A clock frequency divider comprising:
   a token generator producing a token pulse from output bits of a counter counting pulses of a clock signal;
   a shift register receiving the token pulse and passing the token pulse along the shift register under control of the clock signal, the shift register producing N phases of non-overlapping clocks with precise 1/N duty ratio, where N is a positive non-zero integer; and
   a multiplexer receiving the N phases of non-overlapping clocks as selects, the multiplexer switching N multiplexer input signals to a multiplexer output based on the N phases of non-overlapping clocks.

2. The clock frequency divider according to claim 1, wherein the counter further comprises:
   a series of flip-flops, wherein an input to the series of flip-flops is generated by a logical combination of a first set of selected outputs from at least some flip-flops within the series, wherein the token pulse in generated from a second set of selected outputs from flip-flops within the series.

3. The clock frequency divider according to claim 2, wherein the input is generated by logically ANDing inverted outputs from two flip-flops at an end of the series.

4. The clock frequency divider according to claim 2, wherein the token pulse is generated by logically ANDing noninverted outputs from two flip-flops at an end of the series.

5. An interface circuit including the clock frequency divider according to claim 2, wherein the series of flip-flops have a 2/N duty cycle relative to the clock signal, wherein the input to the series of flip-flops is generated by a logical combination of inverted outputs from two flip-flops at an end of the series of flip-flops.

6. The clock frequency divider according to claim 1, wherein the shift register further comprises:
a series of N flip-flops, wherein outputs from the N flip-flops comprise the N phases of non-overlapping clocks.

7. The clock frequency divider according to claim 1, wherein the counter further comprises a series of flip-flops, the token generator further comprises logic coupled to the series of counter flip-flops, and the shift register further comprises a series of N flip-flops, and wherein
an input to the counter flip-flops is generated by logically ANDing inverted outputs from counter flip-flops at an end of the series of counter flip-flops,
the token pulse in generated by logically ANDing noninverted outputs from the counter flip-flops at the end of the series of counter flip-flops, the token pulse having a 1/N duty cycle relative to the clock signal, and
outputs from the N shift register flip-flops comprise the N phases of non-overlapping clocks.

8. A data processing system including the interface circuit according to claim 1, the data processing system further comprising:
a set of inputs receiving N parallel input signals as the N multiplexer input signals of the multiplexer; and
an output connected to the multiplexer output for transmitting serialized data from the N parallel input signals.

9. A method of dividing a clock frequency comprising:
producing a token pulse from output bits of a counter counting pulses of a clock signal;
receiving the token pulse and passing the token pulse along a shift register under control of the clock signal, the shift register producing N phases of non-overlapping clocks with precise 1/N duty ratio, where N is a positive non-zero integer; and
receiving the N phases of non-overlapping clocks as multiplexer selects; and
switching N multiplexer input signals to a multiplexer output based on the N phases of non-overlapping clocks.

10. The method according to claim 9, wherein the token pulse is produced from outputs of a series of counter flip-flops, wherein an input to the series of counter flip-flops is generated by a logical combination of a first set of selected outputs from at least some flip-flops within the series, and wherein the token pulse in generated from a second set of selected outputs from flip-flops within the series.

11. The method according to claim 10, wherein the input is generated by logically ANDing inverted outputs from two flip-flops at an end of the series.

12. The method according to claim 10, wherein the token pulse is generated by logically ANDing noninverted outputs from two flip-flops at an end of the series.

13. The method according to claim 9, wherein outputs from a series of N flip-flops receiving the token pulse comprise the N phases of non-overlapping clocks.

14. The method according to claim 9, wherein the token pulse is generated from outputs of a series of counter flip-flops and the N phases of non-overlapping clocks are generated by a series of N shift register flip-flops, and wherein
an input to the counter flip-flops is generated by logically ANDing inverted outputs from coutner flip-flops at an end of the series of counter flip-flops,
the token pulse in generated by logically ANDing noninverted outputs from the counter flip-flops at the end of the series of counter flip-flops, the token pulse having a 1/N duty cycle relative to the clock signal, and
outputs from the N shift register flip flops comprise the N phases of non-overlapping clocks.

15. A clock frequency divider comprising:
a series of counter flip-flops counting every N pulses of a clock signal;
a token generator receiving outputs from at least some of the counter flip-flops and producing a token pulse with a 1/N duty cycle relative to the clock signal; and
a series of N shift register flip-flops receiving the token pulse and passing the token pulse along the series of shift register flip-flops under control of the clock signal, the shift register flip-flops producing N phases of non-overlapping clocks with precise 1/N duty ratio, where N is a positive non-zero integer; and
wherein the series of counter flip-flops have a 2/N duty cycle relative to the clock signal, wherein an input to the series of counter flip-flops are generated by a logical combination of inverted outputs from two flip-flops at an end of the series of counter flip-flops.

16. The clock frequency divider according to claim 15, further comprising:
a multiplexer receiving the N phases of non-overlapping clocks as selects, the multiplexer switching N multiplexer input signals to a multiplexer output based on the N phases of non-overlapping clocks.

17. The clock frequency divider according to claim 15, wherein the token generator further comprises a logic circuit logically combining non-inverted outputs from the two flip-flops at the end of the series of counter flip-flops.

18. The clock frequency divider according to claim 15, wherein the token generator comprises an AND gate receiving outputs from any two consecutive flip-flops within the series of counter flip-flops as inputs.

19. The clock frequency divider according to claim 15, wherein an output from each of the N shift register flip-flops comprises one of the N phases of non-overlapping clocks.

20. The clock frequency divider according to claim 15, wherein an input to the series of counter flip-flops is generated by logically ANDing inverted outputs from two flip-flops at an end of the series of counter flip-flops, the token pulse in generated by logically ANDing noninverted outputs from the two flip-flops at the end of the series of counter flip-flops, and an output from each of the N shift register flip-flops comprises one of the N phases of non-overlapping clocks.

* * * * *